US009849766B1

(12) United States Patent
MacLean et al.

(10) Patent No.: US 9,849,766 B1
(45) Date of Patent: Dec. 26, 2017

(54) AIR DEFLECTOR SYSTEM AND METHOD FOR SUNROOF

(71) Applicant: AISIN TECHNICAL CENTER OF AMERICA, INC., Northville, MI (US)

(72) Inventors: Eric J. MacLean, Brighton, MI (US); Shintaro Katsura, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/276,133

(22) Filed: Sep. 26, 2016

(51) Int. Cl.
*B60J 7/22* (2006.01)
*B60J 7/043* (2006.01)

(52) U.S. Cl.
CPC . *B60J 7/22* (2013.01); *B60J 7/043* (2013.01)

(58) Field of Classification Search
CPC .................................. B60J 7/22; B60J 7/223
USPC ........................................................ 296/217
See application file for complete search history.

(56) References Cited

U.S. PATENT DOCUMENTS

| 6,926,346 B1* | 8/2005 | Wong .................. B62D 35/001 296/180.1 |
| 7,735,910 B2 | 6/2010 | Ramsay |
| 8,584,793 B2* | 11/2013 | Holzinger .................. B60J 7/22 181/211 |
| 2011/0203673 A1* | 8/2011 | Alvi .......................... B60J 7/22 137/13 |

FOREIGN PATENT DOCUMENTS

FR          2820689      *   8/2002

* cited by examiner

*Primary Examiner* — Dennis H Pedder
(74) *Attorney, Agent, or Firm* — Oblon, McClelland, Maier & Neustadt, L.L.P.

(57) ABSTRACT

An air deflector system for a sunroof of a vehicle including an air deflector with holes along the length of the air deflector and having an input port, an air pump connected to the input port, an airspeed sensor, and an air controller configured to control a speed of the air pump based on the airspeed sensor to enable discharge of an air stream through the holes of the air deflector.

9 Claims, 9 Drawing Sheets

AIR DEFLECTOR SYSTEM AND METHOD FOR SUNROOF

BACKGROUND

Field of the Disclosure

This disclosure relates generally to an air deflector for vehicles. More particularly the present disclosure relates to an air deflector system that utilizes a controlled air stream proximate to a sunroof opening to deflect an air flow field away from the sunroof opening.

Description of the Related Art

A sunroof is a common feature of a vehicle installed in a roof of the vehicle. The sunroof typically includes a panel that is movable between a closed position and an open position. In the closed position, an opening in the roof of the vehicle is closed; while in the open position, the opening in the roof is uncovered. An opening in the roof can have several shortcomings such as wind buffeting and wind throbbing that is transmitted into the vehicle's passenger compartment.

When the vehicle is moving and the sunroof is open, an air flow enters the passenger compartment and causes noise. As such, air deflectors are typically installed on the roof of the vehicle. For example, the air deflector can be a component aerodynamically engineered to reduce noise and fixed on top of the roof at a front of the sunroof opening to prevent the air flow from entering the passenger compartment. Some air deflectors are pivotable and can be adjusted manually or automatically. However, such mechanical systems are complex, thereby reducing their overall reliability. There is a need for an air deflector that is effective to attenuate low- and high-frequency air noise without using complex mechanical systems.

Apart from mechanical systems, in the U.S. Pat. No. 7,735,910 B2, an electric field is used to deflect the air flow field over the sunroof opening to counteract air noise, thereby eliminating the need for a mechanical sunroof deflector and an associated deployment mechanism. The electric field is created by applying a high-voltage signal to electrodes, which causes a weak ionization of the air proximate the electrodes.

However, the above air deflectors can be highly inefficient, bulky, and cost ineffective. As such, improved air deflectors are required.

SUMMARY

According to an embodiment of the present disclosure, there is provided an air deflector system for a sunroof of a vehicle. The system includes including an air deflector with holes along the length of the air deflector and having an input port, an air pump connected to the input port, an airspeed sensor, and an air controller configured to control a speed of the air pump based on the airspeed sensor to enable discharge of an air stream through the holes of the air deflector. The system further includes one or more supports providing a base for the air deflector, and a bracket attached to a roof to hold the one or more supports. Furthermore, the air deflector is connected to a positioning motor. The air controller is further configured to determine a position of the air deflector and adjust the air deflector to the determined position via the positioning motor.

Further, according to an embodiment of the present disclosure, there is provided a method for controlling air discharged from an air deflector for a sunroof of a vehicle, the air deflector having holes along the length of the air deflector and having an input port. The method includes receiving inputs from at least one of an airspeed sensor, a pressure transducer, an activation device, and audio sensor, determining whether the sunroof is open based on information from the airspeed sensor or the activation device, determining a speed of an air pump based on the inputs, and adjusting the speed of the air pump to control an air stream discharged from the air deflector. The method further includes determining a position of the air deflector, and rotating the air deflector to the position via a positioning motor connected to the air deflector. The method further includes determining whether a noise level at the sunroof exceeds a threshold, and adjusting the speed of the air pump or the position of the air deflector until the noise level is below the threshold.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

it is to be understood that terms such as "left," "right," "front," "back," "side," "length," "width," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," and similar terms generally refer to ranges that include the identified value within a margin of 20%, 10% or preferably 5% in certain embodiments, and any values therebetween.

Figure 1:
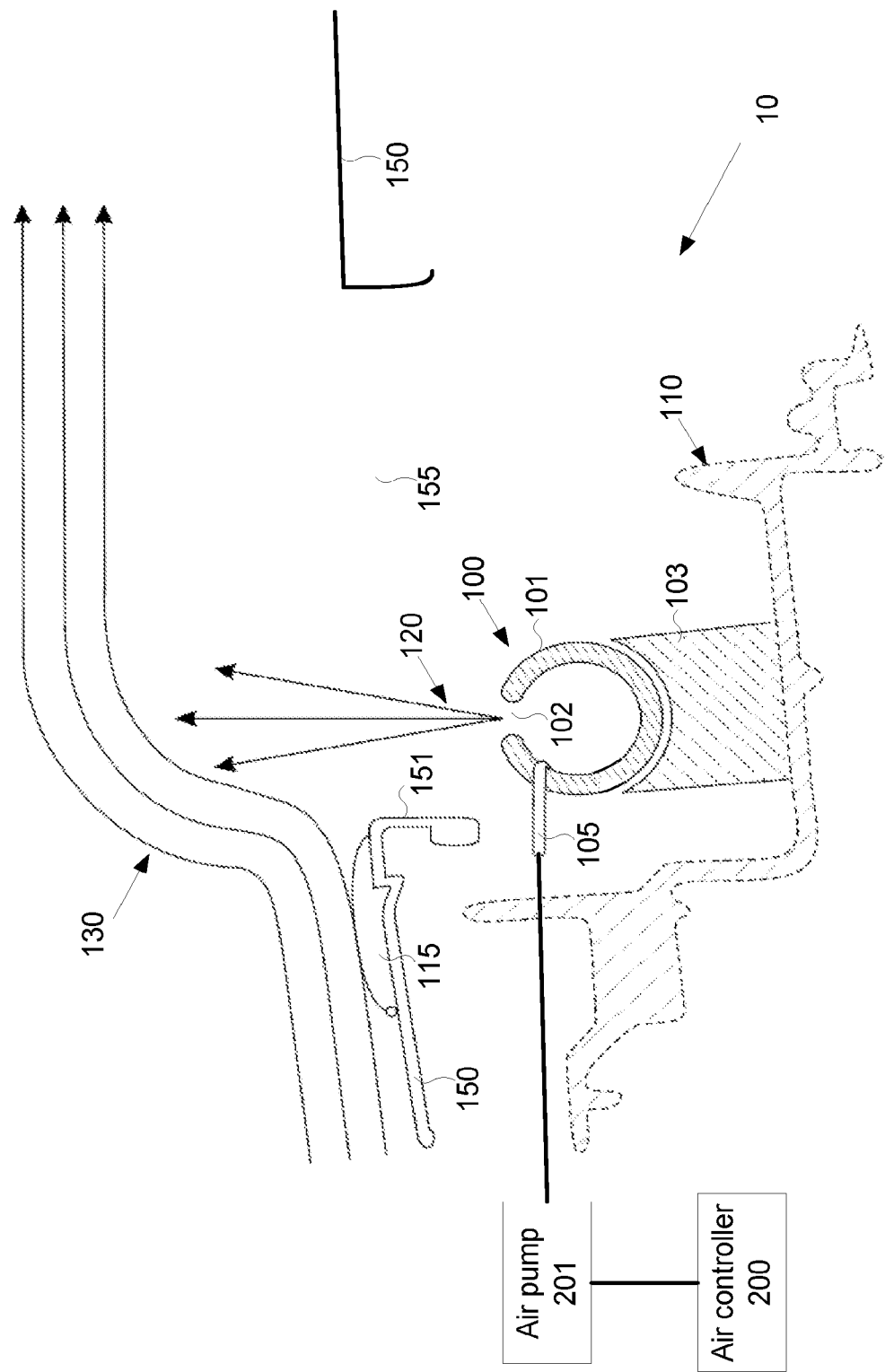
FIG. 1 illustrates an air deflector system according to an exemplary embodiment of the present disclosure.

FIG. 1 illustrates an air deflector system 10 according to an exemplary embodiment of the present disclosure. The air deflector system 10 includes an air deflector 100, which is a tube 101 having a plurality of holes 102 (referred as holes 102 hereinafter) along the length of the tube 101 and an input port 105. The air deflector system 10 further includes an airspeed sensor 115, an air pump 201, and an air controller 200. The air deflector system 10 can be in an active state or an inactive state (discussed with respect to FIG. 6). In the active state, the air pump 201 supplies air to the air deflector 100. The speed of the air pump 201 is controlled by the air controller 200, which in turn affects the speed of an air stream 120 ejected through the holes 102. The air stream 120 deflects an air flow field 130 on the roof of the vehicle in an upward direction. An air flow field is typically generated on the roof of the vehicle and also around the entire vehicle when a vehicle.

The air stream 120 is ejected perpendicular to or at an angle to the air flow field 130. Hence, the air stream 120 intersects the air flow field 130 causing an upward deflection of the air flow field 130 away from a sunroof opening 155.

Figure 2A:
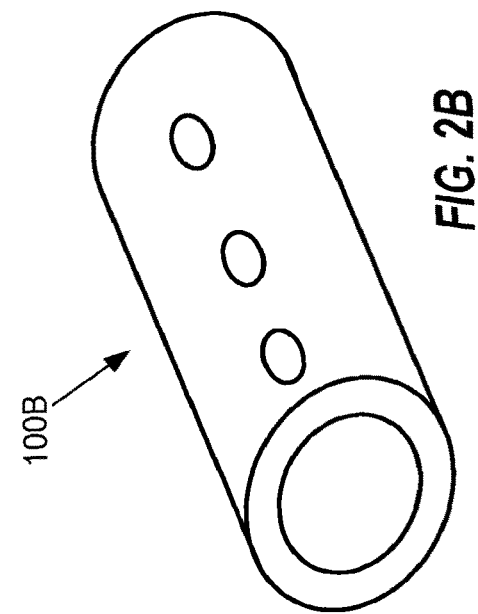
FIG. 2A is a perspective view an air deflector with circular holes according to an exemplary embodiment of the present disclosure.
Figure 2B:
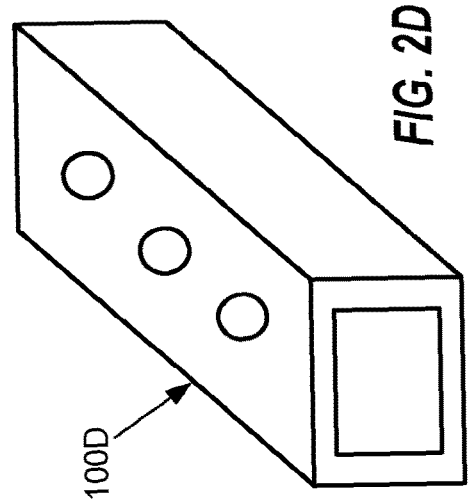
FIG. 2B is a perspective view an air deflector with elliptical holes according to an exemplary embodiment of the present disclosure.
Figure 2C:
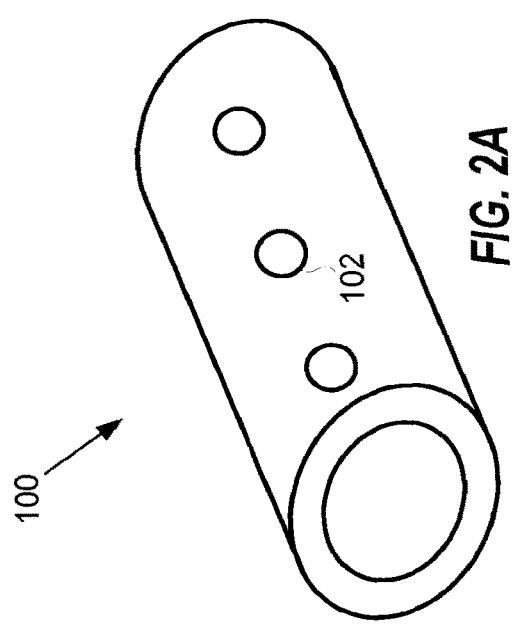
FIG. 2C is a perspective view an air deflector with rectangular holes according to an exemplary embodiment of the present disclosure.
Figure 2D:
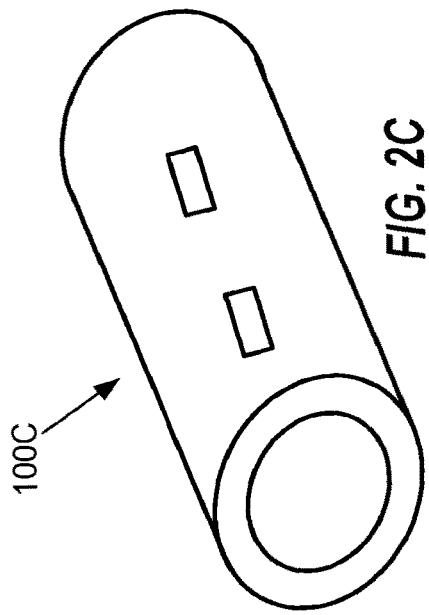
FIG. 2D is a perspective view an air deflector having rectangular cross section and circular holes according to an exemplary embodiment of the present disclosure.

Referring to FIG. 2A, the air deflector 100 can be a hollow tube with a circular cross section and can include holes 102 of circular shape. Furthermore, the ends of the air deflector 100 are closed. In certain embodiments of the present disclosure, the air deflector 100 can have a rectangular, hexagonal, or any other closed cross section. Similarly, the holes 102 can be of any geometric shape such as circular, elliptical, rectangular, etc. Some exemplary variations of the air deflector 100 are illustrated in FIGS. 2B-2D. FIG. 2B illustrates an air deflector 100B having a circular cross section and elliptical holes 102B. In FIG. 2C, an air deflector 100C has a circular cross section and rectangular holes 102C. In FIG. 2D, an air deflector 100D has a rectangular cross section and circular holes 102D.

The air deflector 100 can be made from different materials such as rubber, vinyl, polycarbonate, stainless steel, copper, and nickel. The air deflector 100 can be manufactured using a conventional manufacturing process such as casting, extrusion, machining, molding, and stamping.

Referring back to FIG. 1, the air deflector 100 can be installed such that the holes 102 are pointing towards the sunroof opening 155. The sunroof opening 155 is a small rectangular opening created in a roof 150 of a vehicle. The opening is uncovered when a sunroof (not illustrated) is in a retracted position. The air deflector 100 is installed in the proximity of a front edge 151 of the sunroof opening 155. The air deflector 100 does not touch the sunroof (not illustrated) when the sunroof is in a closed position. The holes 102 are positioned such that the air stream 120 is discharged in a vertically upward direction towards the sunroof opening 155.

The air deflector 100 can be installed on a support 103. The support 103 can be installed on a bracket 110 which can be attached to the roof 150 of the vehicle. The air deflector 100 can be installed in fixed manner (e.g., using fasteners, or a fastening band/strap) or a rotating manner to the support 103. When fixed, the location of the holes 102 will be fixed relative to the roof 150. In one embodiment of the present disclosure, the air deflector 100 can be allowed to move relative to the roof 150, as discussed with respect to FIGS. 3A-3D.

The airspeed sensor 115 determines the speed of air at the front edge 151 of the sunroof opening 155 when the vehicle is moving. An airspeed sensor is different from a speed sensor, which is typically used to measure the wheel speed of a moving vehicle, or an air flow sensor, which is typically installed in an intake manifold to measure the air flow rate of the air entering a combustion engine. On the contrary, the airspeed sensor 115 measures the air speed outside the vehicle, particularly close to the roof 150. The air speed at the front edge 151 can be affected not only by the speed of the vehicle, but also external factors such as the temperature, wind speed, etc. Alternatively or in addition, a pressure sensor, a temperature sensor, and a noise sensor can be installed to determine an air pressure, an air temperature, and a noise level, respectively, of the air flow field 130 formed around the roof 150 when the vehicle is moving.

The air pump 201 delivers air to the air deflector 100 at a controlled pressure and flow rate. The pressure and the flow rate of air is controlled by controlling the speed of the air pump 201, an input air flow to the air pump 201, an output air flow from the air pump 201 or a combination thereof. The air pump 201 can be driven by a motor (not illustrated) by controlling a current supply to the motor using the air controller 200. The current supply can generate one or more high-voltage steady state modulated current (DC), pulse width modulate or alternating current (AC) and a duty cycle sufficient to create enough power to drive the air pump 201.

The air pump 201 receives air from inside of the vehicle and power supply from a battery. Alternatively or in addition, the air pump 201 can receive air from outside the vehicle.

The air pump 201 can be located in the engine compartment under the hood and the output of the air pump 201 can be directed to the air deflector 100 via a pipe or hose (not illustrated). However, the present disclosure is not limited to the location of the air pump 201. The air pump 201 can also be located inside the passenger compartment of the vehicle, attached to the roof top, under the seats, in a trunk, etc.

Figure 3A:
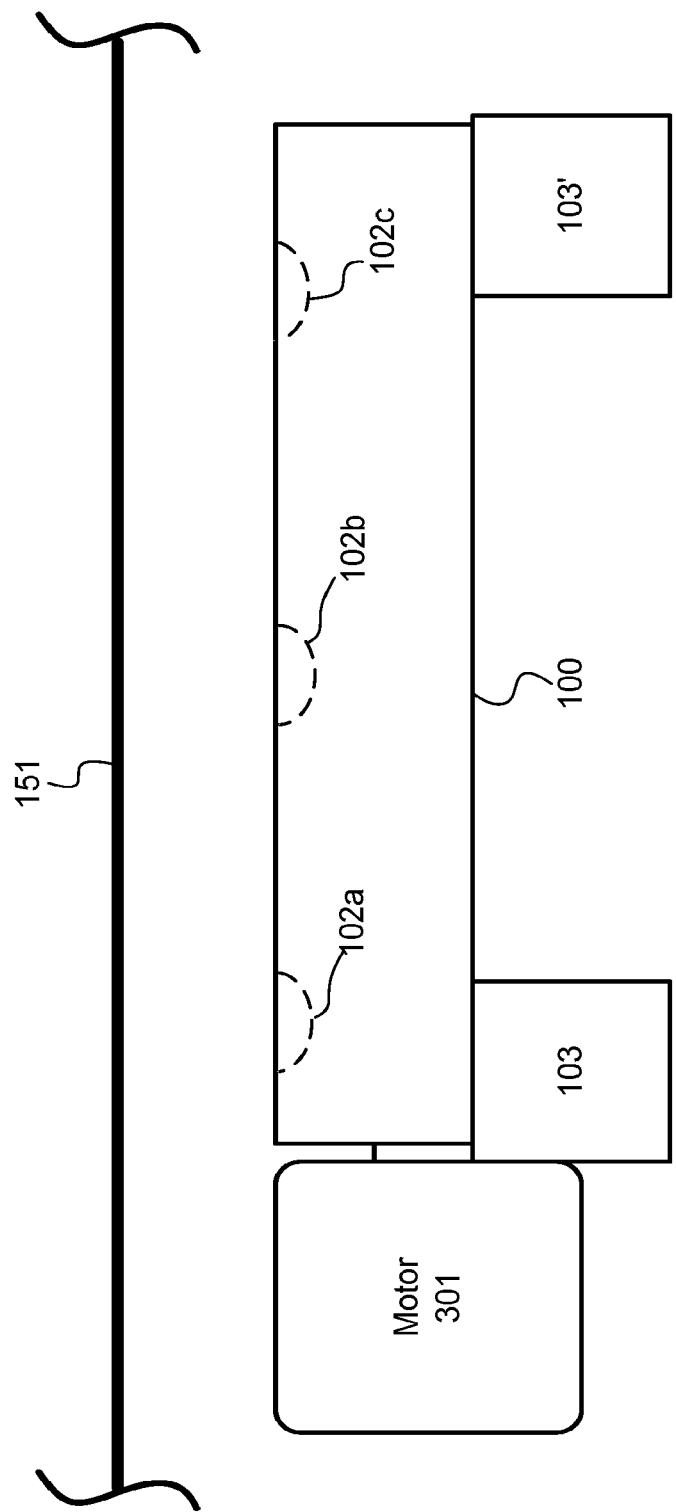
FIG. 3A illustrates the air deflector installed on a support according to an exemplary embodiment of the present disclosure.
Figure 3B:
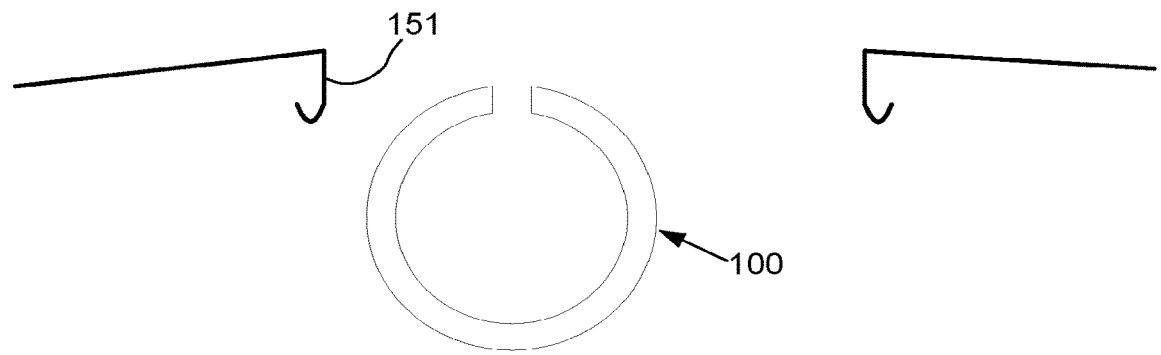
FIGS. 3B-3D illustrates the air deflector positions according to an exemplary embodiment of the present disclosure.
Figure 3C:
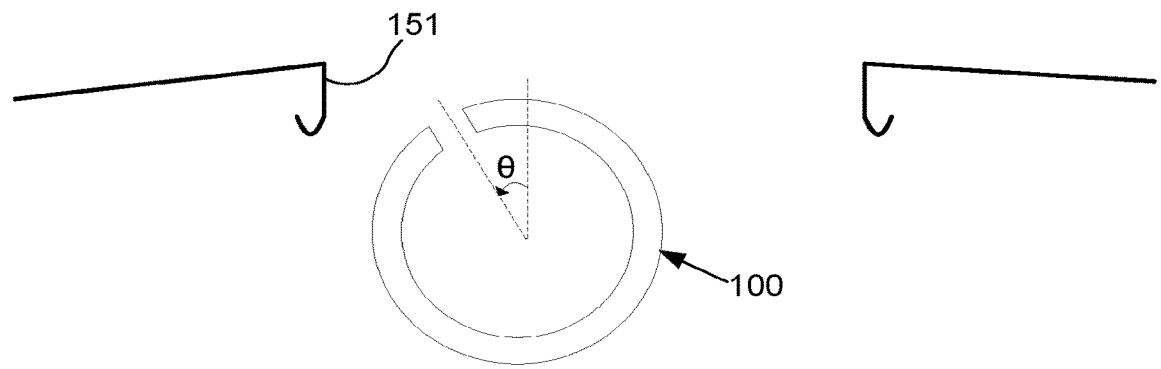
Figure 3D:
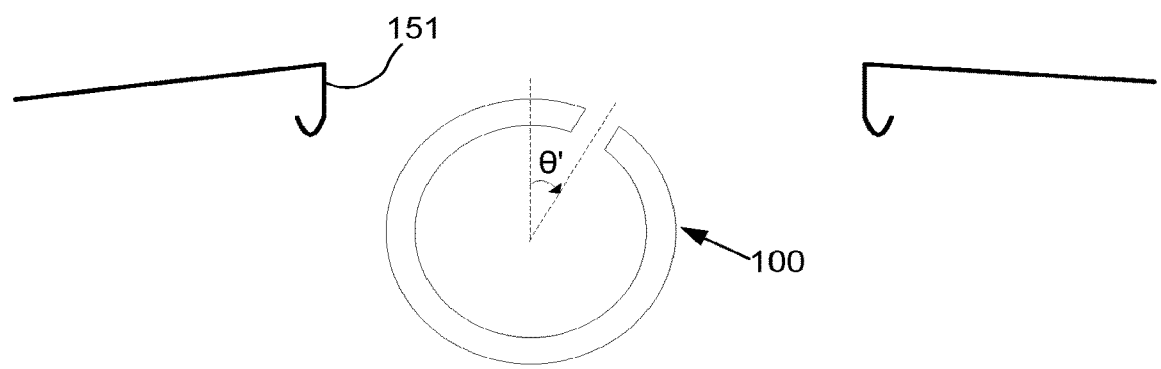

FIG. 3A illustrates the air deflector 100 in a first position according to one embodiment of the present disclosure. In one embodiment, the air deflector 100 can be supported by two supports 103 and 103', where one support 103 is located at a left end of the air deflector 100 and the second support 103' located at a right end of the air deflector 100. Alternatively, the air deflector 100 can be supported by one support 103 located at the midpoint of the length of the air deflector 100. The air deflector 100 can be rested on the support 103 to allow relative motion between the support 103 and the air deflector 100. As such, the location of holes 102a-102c (collectively referred as holes 102) relative to the roof 150 can be changed, using a positioning motor 301, to reduce the noise level at the front edge 151. A positioning motor 301 can be a conventional electric motor configured to rotate the air deflector 100 based on a rotation command received from the air controller 200.

The positioning motor 301 can be controlled by the air controller 200. The positioning motor 301 can rotate the air deflector 100 in a clockwise direction or an anticlockwise direction from the first position, shown in FIG. 3B. For example, the positioning motor 301 can rotate the air deflector 100 in an anticlockwise direction by an angle θ to occupy a second position, shown in FIG. 3C. Similarly, the positioning motor 301 can rotate the air deflector 100 in a clockwise direction by an angle θ' to occupy a third position, shown in FIG. 3D. The amount of rotation θ can be determined by the air controller 200 as a function of the airspeed sensor 115, a turning direction of the vehicle (e.g., right or left), noise frequency, an air pressure and/or air flow rate through the holes 102, etc.

Alternatively or in addition, the air controller 200 can receive an input from a user to control the rotation of the air deflector 100. The user can be a driver or a passenger traveling in the vehicle. A user input based control will allow the user to adjust the position of the air deflector 100 based on the user's comfort level for noise that may be generated when the sunroof is open.

Figure 4:
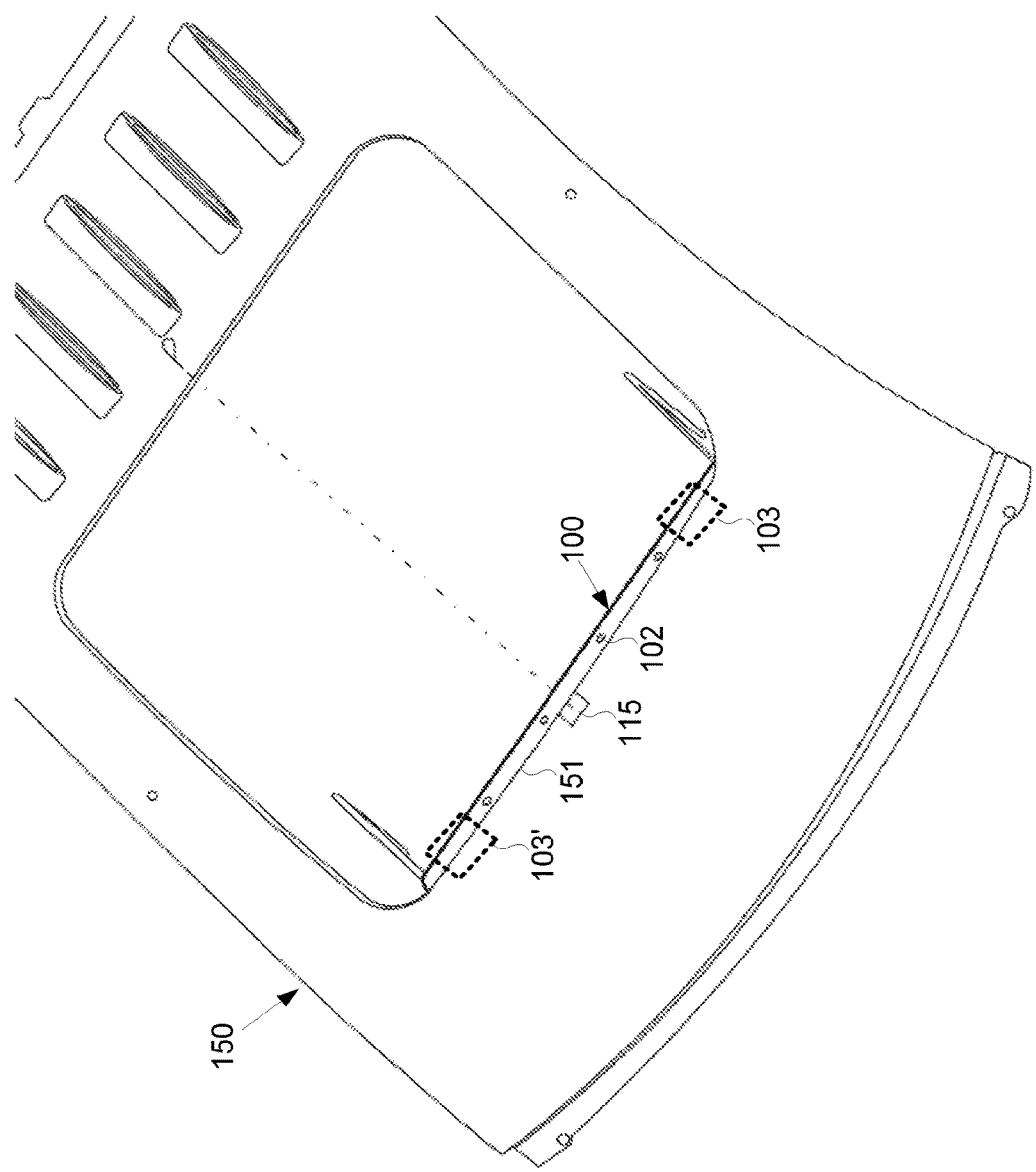
FIG. 4 is a perspective view a roof of a vehicle fitted with the air deflector according to an exemplary embodiment of the present disclosure.

FIG. 4 is a perspective view of the roof 150 of the vehicle fitted with the air deflector 100 according to an exemplary embodiment of the present disclosure. The air deflector 100 is disposed parallel to the front edge 151 of the sunroof opening 155 in the proximity of the front edge 151 under the roof 150. The air deflector 100 can be supported by the supports 103 and 103' at the left end and the right end, respectively, of the air deflector 100.

Figure 5:
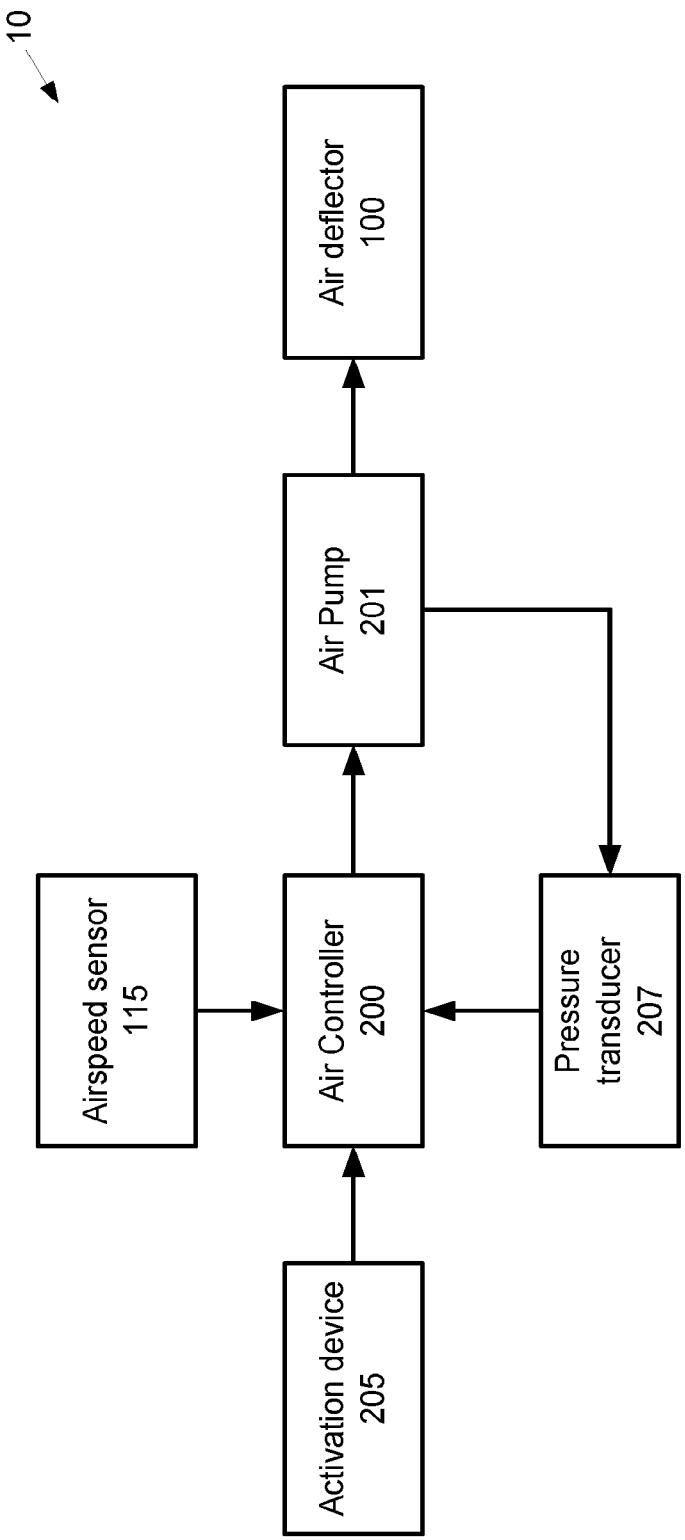
FIG. 5 is a block diagram of the air deflector system according to an exemplary embodiment of the present disclosure.

FIG. 5 is a block diagram of the air deflector system 10 according to an exemplary embodiment of the present disclosure. The air deflector system 10 includes the air deflector 100, the airspeed sensor 115, the air controller 200, and the air pump 201. Optionally, the air deflector system 10 can include an activation device 205, a pressure transducer 207. The air controller 200 can receives input from the airspeed sensor 115, the activation device 205, and the pressure transducer 207. Based on the input, the air controller 200 determines a flow rate at which the air stream 120 must be discharged from the air deflector 100. Accordingly, the air controller 200 controls the speed of the air pump 201. The air pump 201 can deliver air at variable pressure and flow rate, as discussed with respect to FIG. 1 earlier in the disclosure.

The activation device 205 can engage and disengage the air deflector 100. The activation device 205 can be an ON/OFF switch in the passenger compartment that allows an user to control the operation of the air deflector 100. Alternatively, the activation device 205 can include audio sensor, vibration sensor, velocity and pressure transducer to detect and/or quantify wind noise. The wind buffeting or wind throbbing can be characterized by one or more threshold values measured in decibel, hertz, or meters/second. When wind noise such as wind buffeting or wind throbbing is detected, the activation device 205 in conjunction with the air controller 200 can activate the power supply to the air pump 201 to limit the wind buffeting or wind throb in the sunroof opening 155.

Furthermore, according to one embodiment of the present disclosure, the activation device 205 can be a dial to control the rotation of the air deflector 100, as discussed with respect to FIGS. 3A-3D. The activation device 205 can be easily implemented in a digital form as well and accessed via a touch screen of an external device such as a smart phone or a display in the vehicle.

The pressure transducer 207 can monitor the pressure and the air flow rate at the input and output of the air pump 201 to indicate whether the pressure and/or the air flow rate has increased or decreased. Depending on the input from the pressure transducer 207, the air controller 200 can increase or decrease the speed of the air pump 201. Pressure transducers are commonly used in variable speed pumps, as such not discussed in detail for brevity.

Figure 6:
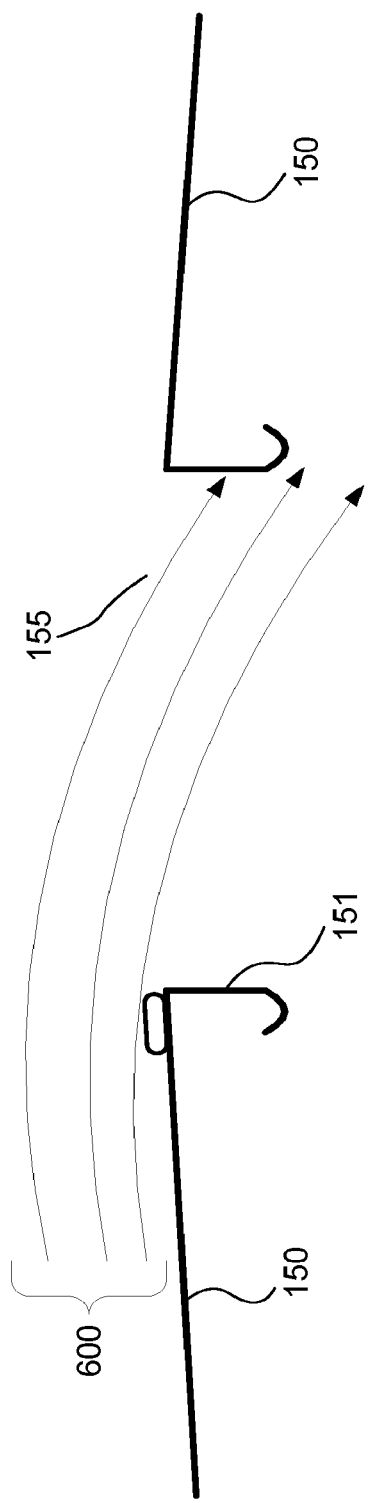
FIG. 6 illustrates an air flow field when the air deflector system is inactive according to an exemplary embodiment of the present disclosure.

FIG. 6 illustrates a natural air flow field 600 when the air deflector system 10 is in the inactive state according to an exemplary embodiment of the present disclosure. In the inactive state, the air pump 201 is switched off; as such, no air is discharged through the holes 102 of the air deflector 100. As the air at the front edge 151 is not deflected, the natural air flow field 600 is directed into the vehicle through the sunroof opening 155. The natural air flow field 600 causes the wind buffeting or throbbing at the sunroof opening 155.

Figure 7:
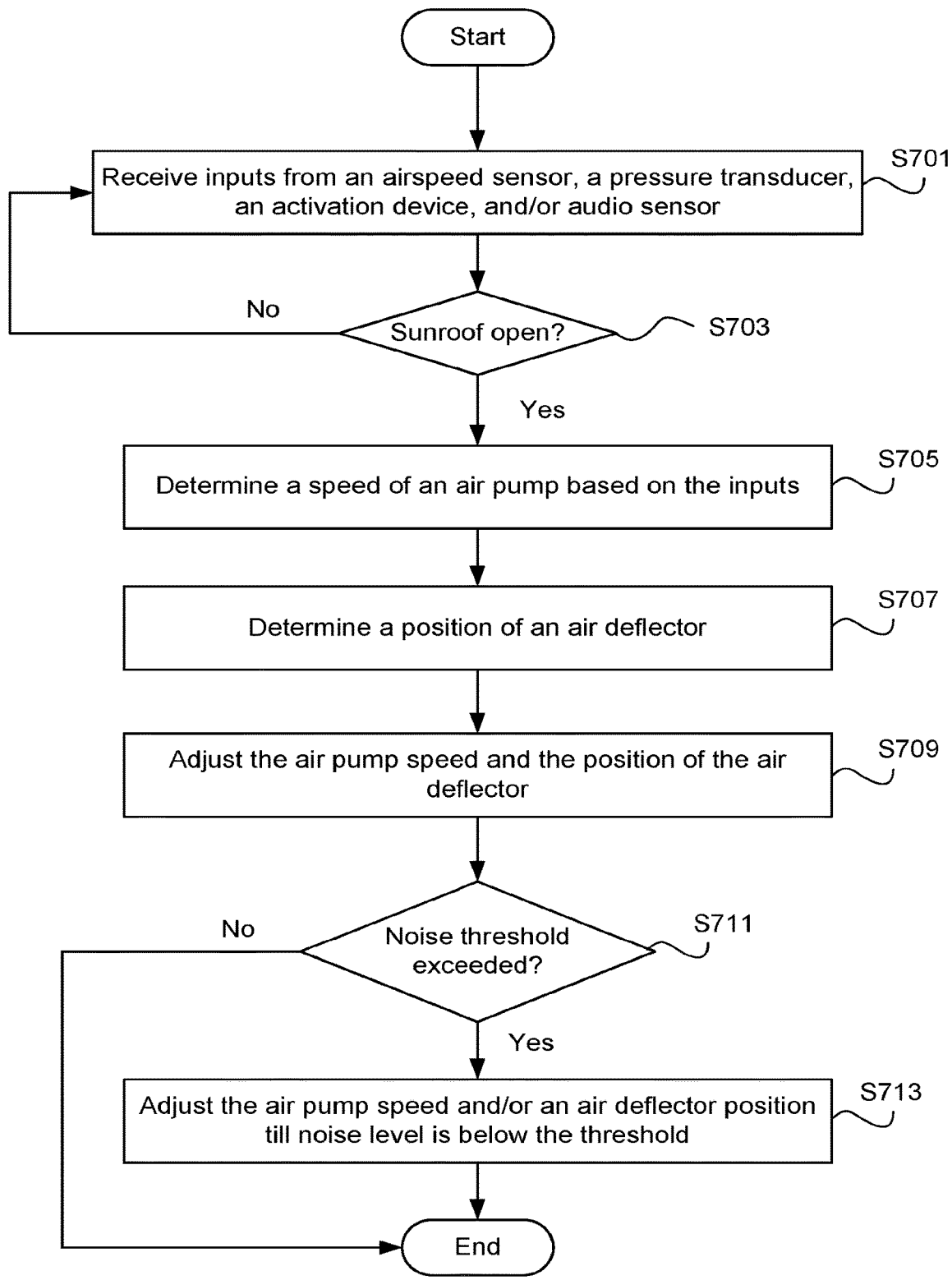
FIG. 7 is a flow chart for an air controller of the air deflector system according to an exemplary embodiment of the present disclosure.

FIG. 7 is a flow chart for the air controller 201 of the air deflector system 10 according to an exemplary embodiment of the present disclosure. The process starts when the vehicle is started. The air controller 200 receives inputs from an airspeed sensor, a pressure transducer, an activation device, and/or audio sensor, in step S701. The airspeed sensor 115 provides the air speed at the front edge 151 of the sunroof opening 155. When the vehicle is stationary, the air speed can be zero or equal to the wind speed. The pressure transducer 207 provides the pressure information related to the air pump 201. In one embodiment, the pressure transducer 207 can measure air pressure at the front edge 151 of the sunroof opening 155. The activation device 205 provides a signal to the air controller 200 to engage or disengage the air deflector 100. The activation device 205 can also indicate that the sunroof is opened. The audio sensor can communicate noise related data, voice command (e.g., open the sunroof, start the air deflector, etc.) to the air controller 200.

In step S703, the air controller 200 determines whether the sunroof is open based on the activation device 205 or the airspeed sensor 115 data. If the sunroof is closed, the air controller 200 continuously read the inputs. When the sunroof is opened, the air controller 200 determines a speed of the air pump 201, in step S705. The speed of the air pump is a function of the airspeed at the front edge 151 measured by the airspeed sensor 115, the pressure at the output of the air pump 201 measured by the pressure transducer 207, an user input provided via the activation device 205, and other sensors data installed inside or outside the vehicle (e.g., vehicle speed, external wind speed, temperature, etc.) that can be related to the noise generation at the sunroof.

In step S707, the air controller 200 determines a position of an air deflector. The position of the air deflector is discussed with respect to FIGS. 3A-3D. The position of the air defector 100 can be a function of user input provided via the activation device 205, the airspeed, the turning of the vehicle, etc. In step S709, the air controller 200 adjusts the speed of the air pump 201 and/or the position of the air deflector 100 using the positioning motor 301, as determined in earlier steps.

In step S711, the air controller 200 determines whether a noise threshold is exceeded. The noise threshold is a sound limit; above the limit, the noise level becomes uncomfortable for human ear or creates undesired vibrations at the roof. For example, the threshold can be 120 dB. The noise threshold can be measured in decibel, hertz, or meters/second. The noise threshold can be predetermined based data (e.g., a noise level and a comfort level) collected for different users. An average of a noise level (e.g., measured in decibel, or hertz) and a comfort level can be computed. The comfort level can be measured on the scale 1 (very uncomfortable) to 5 (very comfortable). Then, an average of noise level having comfort level above 3 can be selected as the noise threshold. Alternatively or in addition, the noise threshold can be specific to the passenger of the vehicle. The noise threshold can be set via the activation device 205 or other appropriate user input devices.

If the noise threshold is not exceeded, the air controller 201 does not make any changes to the air deflector 100. However, if the noise threshold is exceeded, in step S713, the air controller 200 can adjust the air pump speed and/or the position of the air deflector 100 using the positioning motor 301 till the noise goes below the noise threshold.

Figure 8:
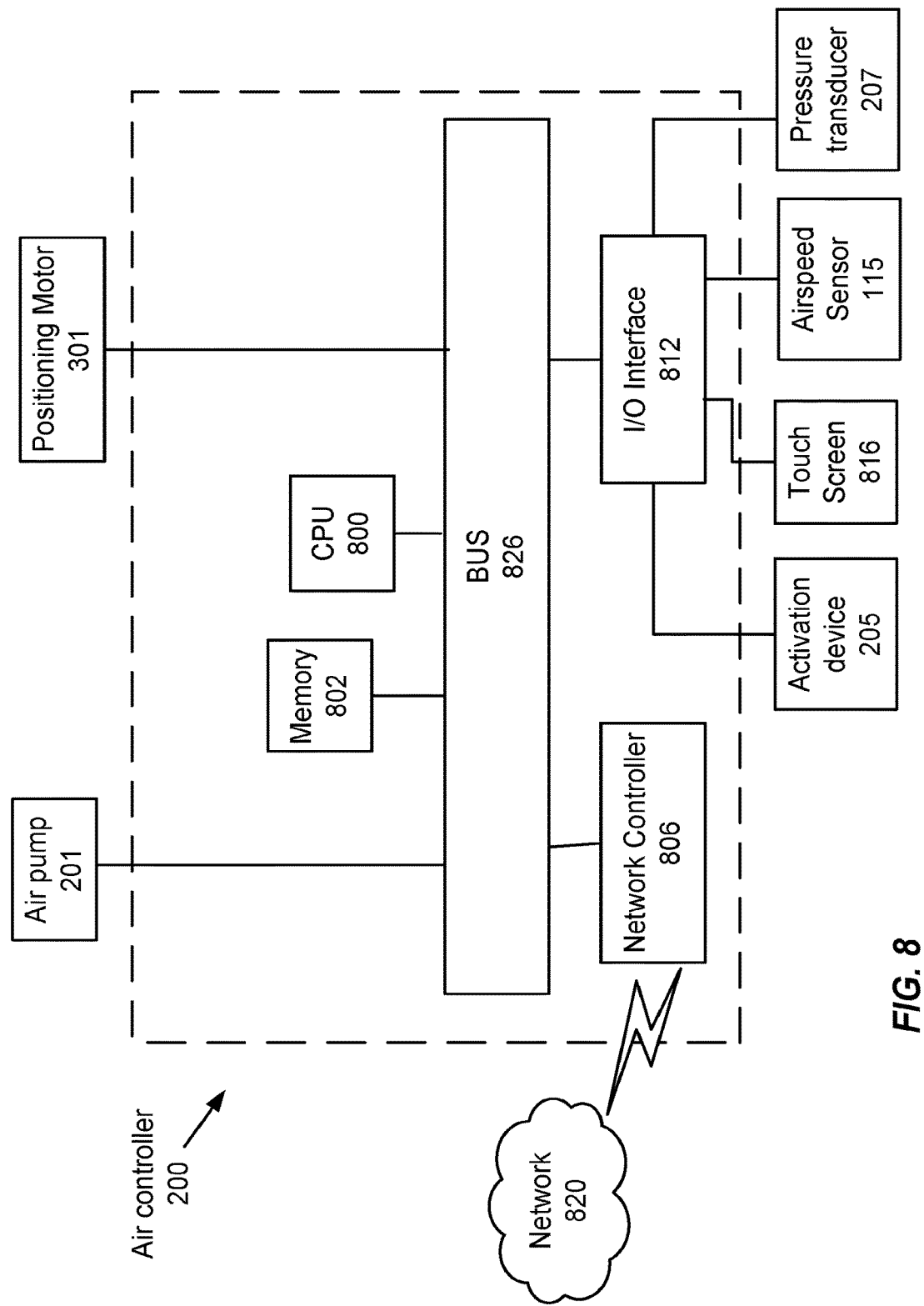
FIG. 8 is a detailed block diagram of an exemplary air controller according to an exemplary embodiment of the present disclosure.

FIG. 8 is a detailed block diagram illustrating an exemplary air controller 200. In FIG. 8, the air controller 200 includes a CPU 800 which performs the processes described in the present disclosure. The process data and instructions may be stored in a memory 802. The hardware elements in order to achieve the air controller 200 may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Further, CPU 800 may be implemented as multiple processors cooperatively working in parallel to perform the instructions of the processes with respect to FIGS. 1, 3A-3D, 4, and 7.

The air controller 200, in FIG. 8, also includes a network controller 806 for interfacing with a network 820. The air controller 200 can communicate with external devices such as a smart phone or a tablet, or electronic control unit (ECU) of the vehicle via the network controller 806.

An I/O interface 812 interface can be used to connect with the activation device 205. The activation device 205 can be implemented in digital form and accessed via a touch screen 816 of an external device. The I/O interface can also connect to a variety of sensors such as the air speed sensor 115 and the pressure transducer 207 as discussed with respect to FIGS. 1 and 5.

Furthermore, the air controller 200 can communicate with the air pump 201 and the positioning motor 301 via the bus 826. Alternatively or in addition, the air controller 200 can communicate via the network 820. For example, issuing rotation commands to the positioning motor 301 and speed control command to the air pump 201.

Although the present disclosure describes the air deflector 100 for a sunroof application, the air deflector 100 can have several applications and not limited to reducing wind buffeting, throbbing or wind noise created at the sunroof opening 155. Alternatively or in addition, the air deflector 100 can be installed in the proximity of the side windows or other locations where wind buffeting can be experienced to deflect the air and reduce the noise level.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An air deflector system for a sunroof of a vehicle, comprising:
    an air deflector with holes along the length of the air deflector and having an input port;
    an air pump connected to the input port;
    an airspeed sensor;
    an air controller configured to control a speed of the air pump based on the airspeed sensor to enable discharge of an air stream through the holes of the air deflector;
    one or more supports providing a base for the air deflector; and
    a bracket attached to the one or more supports,
    wherein the air deflector rotates relative to the one or more supports.

2. The system according to claim 1, wherein the air deflector is at a front edge of an opening of the sunroof.

3. The system according to claim 2, wherein the air stream is discharged from the air deflector in an upward direction to deflect an air flow field at the opening of the sunroof.

4. The system according to claim 1, further comprising:
    a positioning motor connected to the air deflector that rotates the air deflector relative to the one or more supports.

5. The system according to claim 4, wherein the air controller is further configured to determine a position of the air deflector and adjust the air deflector to the position via the positioning motor.

6. The system according to claim 1, wherein the airspeed sensor is attached at a front edge of the opening of the sunroof.

7. A method for controlling an air stream from an air deflector for a sunroof of a vehicle, the air deflector having holes along the length of the air deflector and having an input port, the method comprising:

receiving inputs from at least one of an airspeed sensor, a pressure transducer, and an activation device;

determining whether the sunroof is open based on information from the activation device;

determining a speed of an air pump, connected to the input port of the air deflector, based on the inputs;

adjusting the speed of the air pump to control the air stream discharged from the air deflector, determining a position of the air deflector; and rotating the air deflector to the determined position via a positioning motor connected to the air deflector, wherein the speed of the air pump is a function of an air speed measured by the airspeed sensor and the input from the activation device.

8. The method according to claim 7, further comprising:

determining whether a noise level at the opening of the sunroof exceeds a threshold; and adjusting the air pump speed or an air deflector position until a noise level is below the threshold.

9. The method according to claim 8, wherein the threshold is predetermined to satisfy a comfort level of a user.

\* \* \* \* \*